United States Patent [19]

Schutte

[11] Patent Number: 5,559,502

[45] Date of Patent: Sep. 24, 1996

[54] TWO-WIRE BUS SYSTEM COMPRISING A CLOCK WIRE AND A DATA WIRE FOR INTERCONNECTING A NUMBER OF STATIONS AND ALLOWING BOTH LONG-FORMAT AND SHORT-FORMAT SLAVE ADDRESSES

[76] Inventor: Herman Schutte, Groenewoudseweg 1, Eindhoven, Netherlands

[21] Appl. No.: 216,192

[22] Filed: Jan. 14, 1993

[51] Int. Cl.⁶ .......................... H04L 7/00; H03M 13/00; G06F 11/10
[52] U.S. Cl. .......................... 340/825.21; 370/54; 370/99
[58] Field of Search .................. 375/36, 105; 178/69 R, 178/69 A–69 H, 69 K–6 M, 69.6; 370/100.1, 101, 99, 54; 340/825.21

[56] References Cited

U.S. PATENT DOCUMENTS

| | | | |
|---|---|---|---|
| 4,689,740 | 8/1987 | Moelands et al. | 364/DIG. 1 |
| 4,811,365 | 11/1986 | Manno | 370/101 |
| 5,040,174 | 8/1991 | Takeuchi et al. | 370/100.1 |
| 5,138,634 | 8/1992 | Knapp | 370/101 |
| 5,341,370 | 8/1994 | Nuhn et al. | 375/36 |

OTHER PUBLICATIONS

Philips Semiconductors, Eindhoven, The Netherlands, Jan. 1992, No. 939839340011.

*Primary Examiner*—Thomas G. Black
*Assistant Examiner*—David Yiuk Jung

[57] ABSTRACT

Two-wire bus system comprises a clock wire and a data wire for interconnecting a number of stations and allowing both long-format and short-format slave addresses. A communication bus system has a single clock wire and a single data wire. Each wire has wired logic that upon presentation of any prevalence logic signal value imparts to that wire the prevalence logic value regardless of any non-prevalence value second presented thereto. The system has clock synchronization by a master station of any information transmission. The system arbitrates among coexistent prospective masters to select a single actual master. The protocol has a start condition by presenting said first value to the data wire with the clock line at the second value, and generates any subsequent data wire transition exclusively under existence of the prevalence value on the clock wire. The subsequent stop condition is represented by a transition to the second value on the data wire with the clock wire at the second value. The message format has an initial byte accommodating either a short slave address, or alternatively both a control signal indicating a long-format slave address inclusive of a high significance address part, to be followed in the next byte by a low significance part of the address. For enhancing the bit rate, the system has a switched pull up device, whereas furthermore each station has a slope controlled output stage.

20 Claims, 3 Drawing Sheets

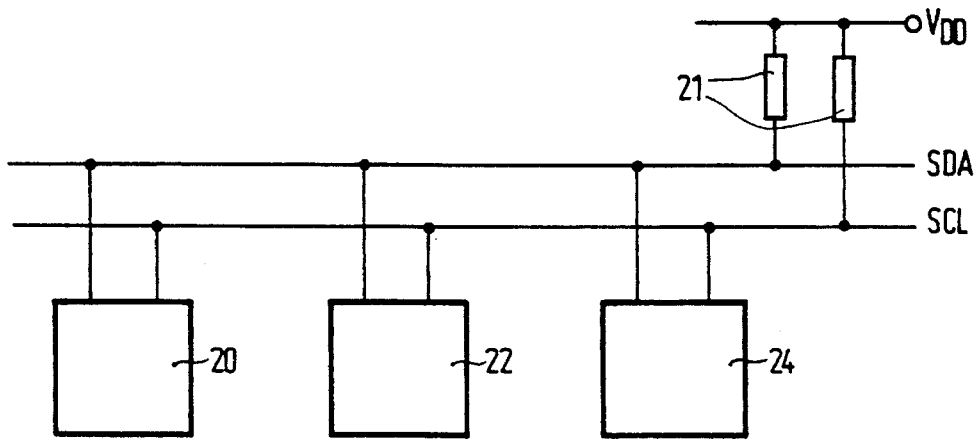
FIG.1
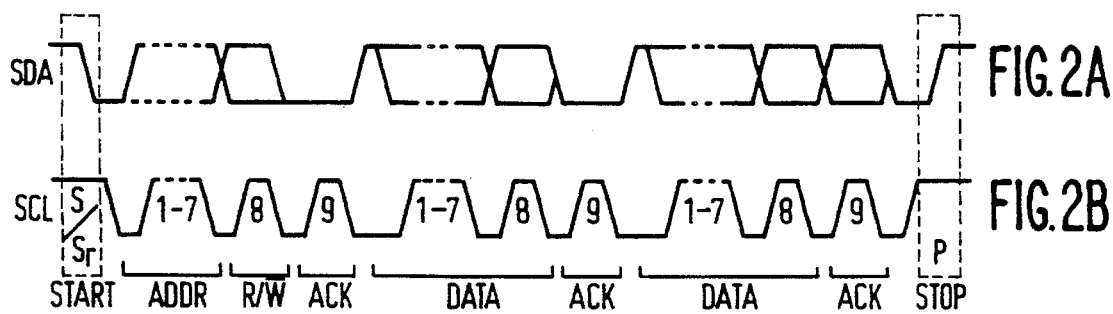
FIG.2A
FIG.2B
FIG.3
(write)
FIG.4

5,559,502

TWO-WIRE BUS SYSTEM COMPRISING A CLOCK WIRE AND A DATA WIRE FOR INTERCONNECTING A NUMBER OF STATIONS AND ALLOWING BOTH LONG-FORMAT AND SHORT-FORMAT SLAVE ADDRESSES

FIELD OF THE INVENTION

The invention relates to a two-wire bus communication system that allows for an extremely straightforward protocol between stations which stations are usually respective integrated circuits, and suitable in particular for use within a consumer electronics device such as for audio-video entertainment and personal communication, although such proposed use should not be construed as an express limitation. Present-day electronics has realized various bus protocols and environments for application in numerous commercial fields.

BACKGROUND TO THE INVENTION

Principal state of the art is the so-called $I^2C$ bus that has been patented in U.S. Pat. No. 4,689,740 assigned to the present assignee. With a seven bit address space the reference allows to explicitly address some one hundred-odd stations, without requiring that the addressing master have any knowledge about the physical position of the addressee. Due to the various different types of stations, with respect to their internal functionality, and also due to the various different manufacturers that have entered this fast-growing market, the present inventor has experienced a growing dearth of available addresses to such an extent that necessity repeatedly has caused assigning of a particular address to various types of stations.

SUMMARY OF THE INVENTION

Accordingly, amongst other things it is an object of the present invention to greatly increase the number of available addresses, while keeping inside the already specified $I^2C$ protocol already specified, and also while keeping the necessary message length quite restricted. As a related object to the above, which effectively boils down to expanding a spatial parameter such as the address space to a greater value, it was felt necessary to enhance the attainable bit rate or in other words a temporal parameter. Now, according to one of the aspects of the invention, the object is realized in part by a communication bus system, comprising a plurality of stations interconnected by a single clock wire and a single dam wire. Each wire being provided with wired logic functionality means for upon presentation thereto of at least one prevalence logic signal value, from any station imparting to the wire in question the prevalence first logic value regardless of any non-prevalence second value presented thereto, the system being arranged for under clock synchronization by a master station transmitting information from a source station to a destination station. The system having arbitration means for upon coexistent manifestation of more than one prospective master station through bitwise arbitration selecting an actual master station thereamongst, the system in a master station having protocol means for generating a start condition by presenting said first value to the data wire with the clock wire at the second value, for generating any subsequent data wire transition exclusively under existence of said first value on said clock line, and for generating a subsequent stop condition by a transition to said second value on said data wire line with said clock wire at said second value, and in such master station having message formatting means for producing a bytewise acknowledgeable message constitution, an initial byte accommodating a short slave address, characterized in that such formatting means are arranged for in said initial byte signalling both a forthcoming long-format slave address inclusive of a high significance address part thereof, and in a next-following byte a low significance address part thereof. This means that the address length of the newly added space is greater than one byte, in particular 10 bits, which appears sufficient for a long time to come: the number of allowable addresses has been enhanced by a factor of about ten. The addition of only the addresses that would fit in a single byte (256 addresses) was expected to produce the same problems encountered at present again within short time. On the other hand the message length is only increased by a single byte. If only the extra byte itself were used, 256 addresses could have been added; if then the added address space should have been greater, a further byte would have to be added.

Advantageously, the system has switched pull up means for under control of an incipient upgoing signal edge on any said wire transiently lowering a pull up resistance value of said pull up resistance means with respect to an otherwise steady state pull up resistance value. In particular, this device would be needed only once for each wire in a system for so providing a kind of feed-forward to increase the pulling up speed of the associated wire.

The invention also relates to a master station and to a slave station for use with such communication bus system and having the extended addressability feature. Advantageously, such station would comprise a slope-controlled output stage connected to one of said wires, said stage having pull down switch means drivable by a stage input signal for then downpulling a stage output and having low-pass filtering means for during said downpulling partially attenuating a control signal to said pull down switch means, whereby an output slope of said stage is expanded. In particular, this would at such increased bit rate provide EMC (Electro Magnetic Compatibility) adherence.

Further advantageous aspects are recited in dependent claims.

In consequence, a "ten-bit addressing" feature can be added to an $I^2C$ bus system, without conflicting with the original; bus protocol and without conflicting with the normal operation of existing seven-bit address devices in the same system. Further, seven-bit addressing and ten-bit addressing can be used simultaneously in a single system, while maintaining existing principles for arbitrating and synchronizing between respective prospective master stations. Effectively, a seven-bit address gets preference over a ten-bit address. A ten-bit addressing format for a "data transmit" operation needs one extra byte over a seven-bit addressing "data transmit" format. A ten-bit addressing format for a "data receive" operation needs one extra byte over a seven-bit addressing "data receive" format, because after a repeated start condition only the most significant address part is required. A ten-bit addressing format for a combined "data transmit" and "data receive" operation needs one extra byte over a combined seven-bit addressing "data transmit" and "data receive" format, because after a repeated start condition only the most significant address part is required. Finally, slave addresses 11111XX remain reserved for future extensions.

STATEMENT OF ADDITIONAL PUBLICATION

The present invention has to an appreciable part been published in the document "The $I^2C$ bus and how to use it"

(including specifications) by Philips Semiconductors, Eindhoven, The Netherlands, of January, 1992, No. 939839340011, which has been received at the premises of assignee on Jan. 27, 1992, and in consequence, has not been distributed to the Public before Jan. 31, 1992, which is less than one year before the filing date of the present application for patent. This document added various aspects to the earlier existing I²C system, while stating explicitly that Neither the 100 kbits/s nor the 100 kbits/s devices have been changed. This means that all aspects of the earlier bus protocol remain in force. Notably, 7-bit and 10-bit addresses may be used on a single system. The only limitation is that slow (100 kbits/sec) stations may not be used in a fast (400 kbits/sec) system.

BRIEF DESCRIPTION OF THE DRAWINGS

Further aspects and advantages of the invention will become apparent with respect to the appended disclosure of preferred embodiments with its associated Figures that show in particular:

FIG. 1 is an elementary block diagram of an I²C system;

FIGS. 2A and 2B are a signal diagram of a complete data transfer;

FIG. 3 is a diagram of a data transmit with 7-bits address;

FIG. 4 is a diagram of a data transmit with 10-bits address;

DETAILED DESCRIPTION OF PREFERRED EMBODIMENTS

Figure 5:
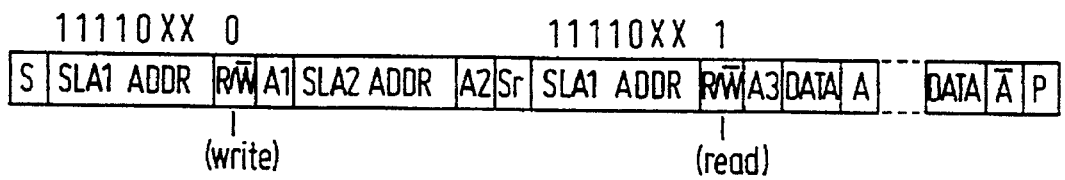
FIG. 5 is a diagram of a data receive with 10-bits address.

Herein various embodiments according to the invention are described. FIG. 1 is an elementary block diagram of an I²C system with serial data wire SDA, serial clock wire SCL, and three stations 20, 22, 24. Generally, with respect to the bus interface each station is executed as a single integrated circuit, but this is not an express restriction. For brevity, the wired logic functionality and the register structure of the stations is not discussed extensively, as these have been already described long ago in the first reference.

FIGS. 2A and 2B show a complete data transfer. The start condition S or repeated start condition Sr implies a change of the data wire to the prevalence logic condition (from high to low) while the clock wire is still at the non-prevalence condition (=high). Any prospective master station can do this so long as the bus has not been assigned to another master. At the end, the stop condition P is anti-symmetric with the start condition. At all other times, the dam may only change when the clock is at the prevalence value (=low). The first transfer has seven address bits, next a read/write (R/W) control bit, and space for an acknowledge bit from another station having recognized its slave address. Subsequently, a series of 8-bit data bytes is transmitted, each with its own space for an acknowledge bit. In case of a long-format 10-bit address, the first data byte is replaced by the second byte of the slave address. If two or more prospective masters start transmitting simultaneously, the arbitrage is effected bit by bit on the basis of the slave address. If more than one prospective master addresses the same slave, the arbitrage may thus proceed on the basis of the subsequent data.

FIG. 3 is a diagram of a data transfer with 7-bits address; hatching means transfer direction from master to slave; the non-hatched remainder goes the opposite way. Here, the transfer direction of successive bytes is not changed. The transmission sequence is start condition S, seven bit slave address SLA, read/write control bit R/W' indicating a write (0), address acknowledge A, sequence of one or more data bytes each accompanied by its own acknowledge A, and stop condition P. The final acknowledge may have logic value 'false'.

FIG. 4 is a diagram of a data-transmit to a slave station with a 10-bit address. The difference with the preceding Figure is that the first slave address byte SLA1 starts with a control code 11110, which indicates a forthcoming long-format slave address. This code as well as 11111 are forbidden for the short format seven-bit slave address. This means that in principle, 120 different addresses were available. In practice, a few of these have been reserved, such as for "address all slaves". Now, any such address has at least one zero in the four leading bit positions. The arbitrage grants a "zero" bit prevalence to a "one" bit, which means that any seven-bit address always "wins" against a ten-bit address. Next, the sixth and seventh bits are the high-significance bits of the long-format slave address. Slave stations having a short-format address are precluded from being addressed through the control code 11110, while being completely normally addressable through their respective original address codes. Slave stations having the long-format address and the correct high significance address part SLA1 now give a positive acknowledge A1, even if their low-significance address part would not match. After the second slave address byte SLA2 only the slave station with the total correct slave address will give a positive acknowledge A2. Next, a sequence of data bytes is transmitted just as in the earlier case.

FIG. 5 is a diagram of a data-receive from a slave station with a 10-bit address. The transmission of the long-format slave address is identical to that of the preceding Figure, up to acknowledge A2. Subsequently, a repeated start condition Sr is given to signal to the actually locked-in slave station that a control change will be undertaken. This is effected by producing a repeated start condition, having the same shape as the original start condition, and repeating the first address byte, again SLA1, but with inverting the read/write control bit. Subsequently, the one- or multi-byte data transfer is undertaken as before, be it that the data transfer direction is now towards the master. The clock synchronization is always effected by the master station, regardless of the direction of the data transfer. During arbitrage between a plurality of prospective master stations, they all generate clock pulses that merge through the wired logic functionality jsut as in the case of the various address bits generated by those prospective master stations on the data wire.

Figure 6:
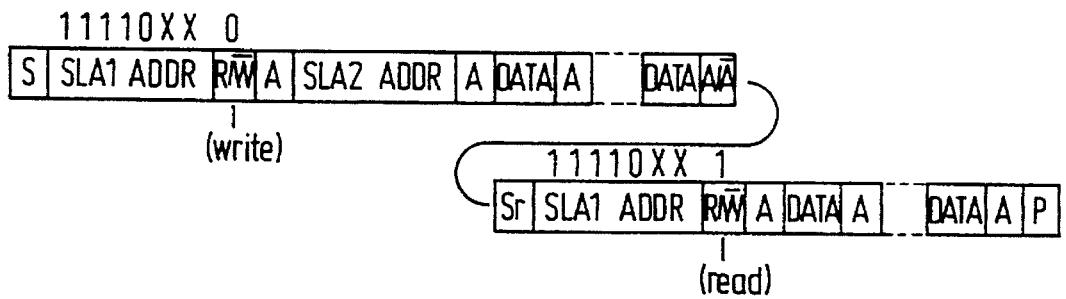
FIG. 6 is a diagram of a bidirectional data transfer with 10-bits address.

FIG. 6 is a diagram of a combined data transmit and receive format with a 10-bits address. The format largely conforms to that of FIG. 5, be it that the repeated start condition and associated first slave address byte SLA1 are only given after one or more data bytes had been transmitted from the master towards the slave station.

Figure 7:
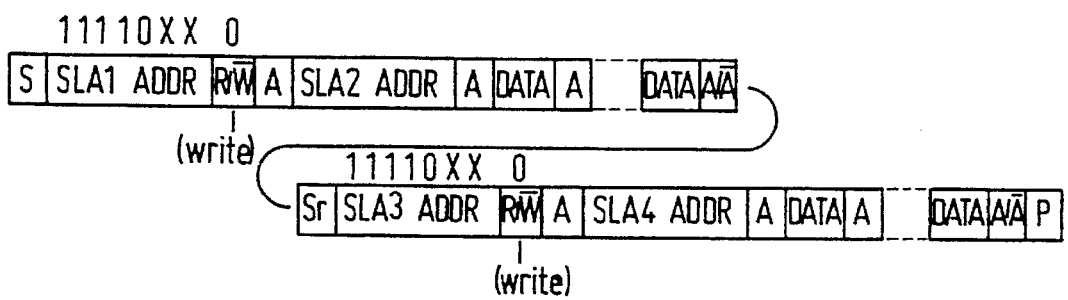
FIG. 7 shows a data transmit with two 10-bits addresses.

FIG. 7 shows a data transmit with two 10-bits addresses. This largely corresponds to the setup of FIG. 4, be it that now data is transmitted first to one slave, next to another slave, each with a repective ten-bit adrress, without releasing the bus.

Figure 8:
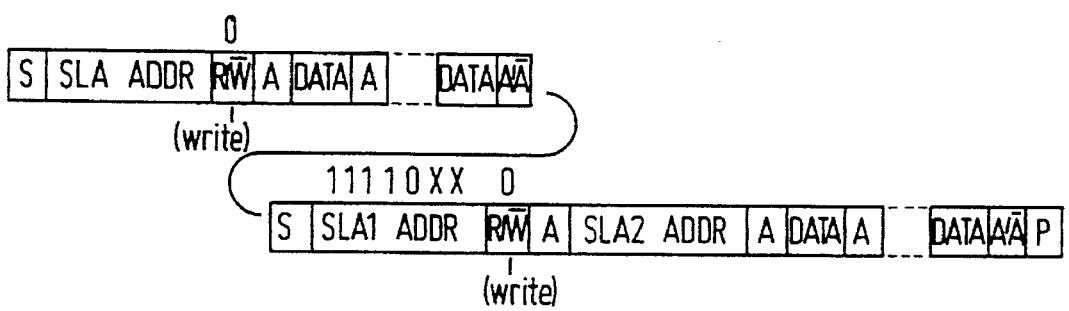
FIG. 8 shows a data transmit with 10-bits and 7-bits addresses mixed.

FIG. 8 shows a data transmit with mixed addresses. First, the set-up with a seven bit address is shown, followed by addressing of a slave station that has the long-format address, again without releasing the bus. The alternative sequence, starting with a ten-bit slave address is feasible just as well. In similar fashion, an established master may go on addressing successive slave stations with arbitrary seven-bit and ten-bit addresses, and either for a data-transmit or for a data receive operation. The bus is only released with the stop condition P. Thereafter, any propspective master, whether earlier rejected during the arbitrage, or newly emerged, may start a fresh arbitraging operation.

Figure 9:
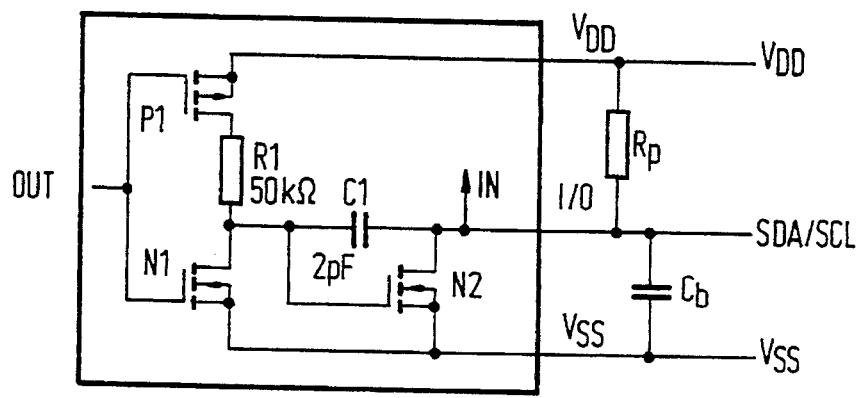
FIG. 9 shows a slope controlled output stage in C-MOS.

FIG. 9 shows a slope controlled output stage in C-MOS; this circuit is added at the interface between the respective station and either the clock wire SCL or the data wire SDA; the circuit is thus generally provided twice for each applicable station. Now, the wire in question has a pull-up resistance $R_p$ to $V_{DD}$ and a load Capacitance $C_b$ to $V_{SS}$. As shown, the wire itself is bidirectional: I/O. The signal input of the station in question has been labeled IN, the signal output has been labeled OUT. The latter goes to a CMOS inverter P1/N1, whose output controls line drive transistor N2. Steering the latter to conductivity can bring the wire voltage to $V_{SS}$ within a very short time of a few nanoseconds only. This circuit has been intended for allowing a higher bit-rate of some 400 kbits/second. Now, the circuit shown would at such increased bit rate provide better EMC (ElectroMagnetic Compatibility) adherence. The effect is realized through provision of resistor R1 and capacitor C1, which together provide a time constant of 100 nanoseconds. In fact, if the line voltage changes too fast towards $V_{SS}$, capacitor C1 operates as a Miller capacitor for coupling the instantaneous wire voltage to the control electrode of transistor N2 for so slowing down the transient signal edge. A particular advantage of the circuit is that no current source is necessary during standby operation, when the station in question is non-transmitting. In the other direction, when transistor N2 is steered to a blocking condition, the pull-up resistor $R_p$ is rather too high for allowing a sufficiently fast edge, as will be discussed with respect to FIG. 11. For brevity, the attachment of connections IN and OUT, respectively, to the inner functionality of the station in question has not been shown.

Figure 10:
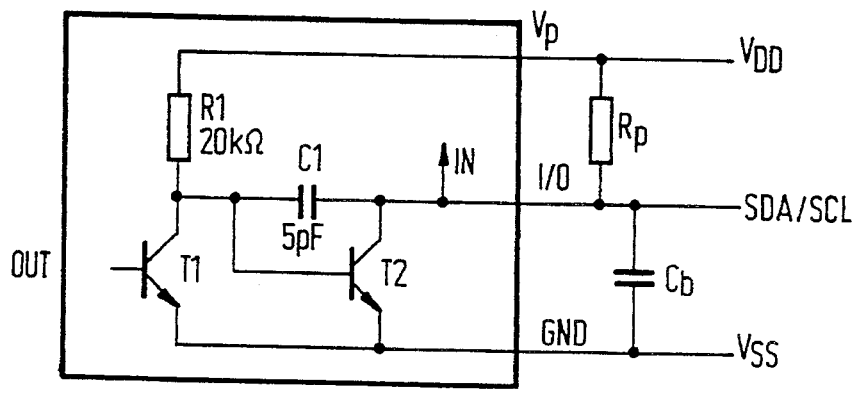
FIG. 10 shows a slope controlled output stage in bipolar.

FIG. 10 shows a slope controlled output stage using bipolar transistors. The circuit to a great extent corresponds to that of FIG. 9, and largely has the same advantages. The line drive transistor T2 is controlled by the output signal of transistor T1. Because of the necessity of providing the base current of transistor T2, resistor R1 now has a lower value. Through increasing the value of capacitor C1, the RC time constant value is kept the same. Variations on the theme shown would likewise flatten the edge within the context of the present invention.

Figure 11:
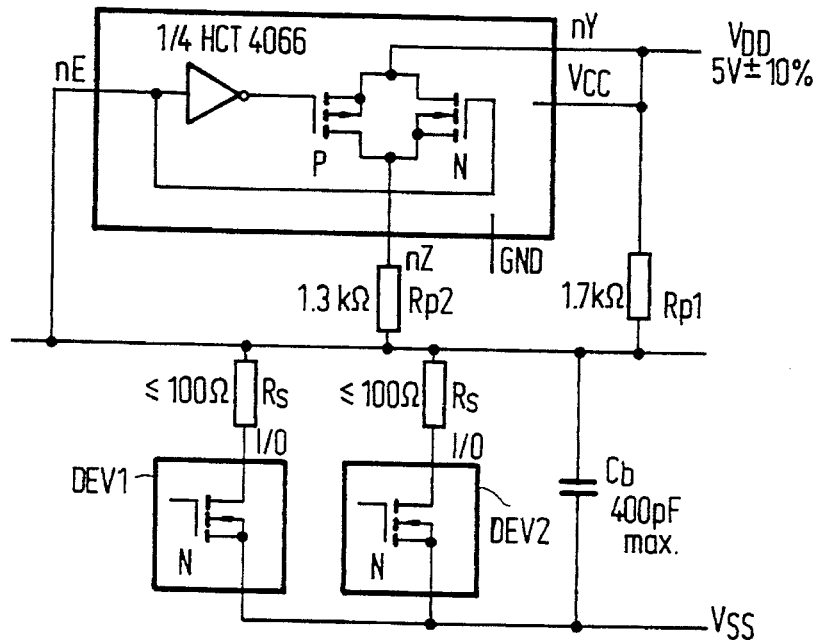
FIG. 11 shows a switched pull-up circuit.

FIG. 11 shows a switched pull-up circuit. In principle, this needs to be provided only once for each wire SDA or SCL. Specifically shown are two stations DEV1, DEV2, together with their optional serial input resistance $R_s$, and line drive transistors N (N2 in FIG. 9). The maximum load capacitance $C_b$ is 400 pF. For small systems, wherein this capacitance is lower than 200 pF, the circuit of FIG. 11 may even be omitted. During the rising/falling edges on the bus wire, the bilateral switch cum inverter in HCT4066 switches pull up resistor $R_p2$ on and off between levels of 0.8 and 2.0 Volts, respectively. Combined resistors $R_p1$ and $R_p2$ can pull up the bus wire within the maximum specified rise time of 300 nanoseconds.

I claim:
1. A communication bus system having an extended addressability feature, comprising:

a single clock wire and a single data wire each including logic means for enabling said wires to each assume a particular second voltage value and to enable each wire to be forced to a first voltage value;

a plurality of stations interconnected by said clock wire and said data wire, wherein at least one of said stations includes means for forcing each of said wires to their respective first voltage values and means for allowing each of said wires to assume their respective second voltage values, and wherein a master station is one of said stations which has gained priority to said data wire for initiating transfer of information on said data wire, said system being arranged for transferring information between said stations on said data wire under the synchronization of the voltage levels of said clock wire, and wherein each of said stations is addressable by one of (i) a long-format slave address and (ii) a short-format slave address;

arbitration means for selecting one of said stations as a master station upon more than one of said stations attempting to provide information on said data wire at the same time;

said master station having protocol means for generating information on said data wire in synchronization with the voltage level of said clock wire, said master station further including message formatting means for enabling said master station to produce in an initial byte of information one of a) a short-format address and
b)(i) a control signal indicating a forthcoming long-format address and (ii) a first significant portion of the long-format address, and if the control signal is present in the initial byte of data then in a second byte of data said message formatting means producing a second significant portion of the long-format address such that said master station does not address a station having a short-format address when addressing a station having a long-format address thereby enabling stations having both short-format and long-format addresses to communicate in said system.

2. A system as claimed in claim 1, wherein the first significant portion is at least two bits.

3. A system as claimed in claim 2, wherein the second significant portion is at least seven bits.

4. A system as claimed in claim 1, wherein said logic means includes pull-up resistance means coupled to said wires for enabling said wires to assume their second voltage values.

5. A system as claimed in claim 4, wherein said pull-up resistance means has a steady state pull-up resistance value and said system further includes switched pull-up means for under control of a change from a second voltage value to a first voltage value of any of said wires, transiently lowering the resistance of said pull-up resistance means from the steady state pull-up resistance value to an otherwise steady state pull-up resistance value.

6. A master station for use in a communication bus system having an extended addressability feature and a plurality of stations, each station having one of i) a long-format address, and ii) a short-format address, said master station comprising:

means for connecting to a single clock wire and a single data wire, each wire including logic means for enabling said wires to each assume a particular second voltage value and to enable each wire to be forced to a first voltage value;

means for providing clock synchronization signals on said clock wire for synchronizing information transmission between said stations;

information bit means for providing information on said data wire by forcing said data wire to its respective first voltage value and for allowing said data wire to assume its respective second voltage value;

detecting means for detecting bitwise data inconsistency between the voltage value of said data wire and the expected voltage value of said data wire which corresponds to the information provided by said information bit means; and message formatting means for producing in an initial byte of information one of
a) a short-format address and
b) (i) a control signal indicating a forthcoming long-format address and (ii) a first significant portion of the long-format address, and if the control signal is present in the initial byte of data, then in a second byte of data said message formatting means producing a second significant portion of the long-format address such that said master station does not address a station having a short-format address when addressing a station having a long-format address thereby enabling stations having both short-format and long-format addresses to communicate in said system.

7. A station as claimed in claim 6, and comprising a slope-controlled output stage having an output connected to one of said wires, said stage having pull-down switch means drivable by a stage input signal for pulling down the stage output and further including low-pass filtering means for delaying the pulling down of the stage output such that an output slope of said stage is expanded.

8. A slave station for use in a communication bus system having an extended addressability feature, comprising:

means for attaching to a single clock wire and a single data wire wherein each wire includes logic means for enabling said wires to each assume a particular second voltage value and to enable each wire to be forced to a first voltage value;

means for receiving clock synchronization signals for synchronization;

said communication bus system including
a) a plurality of stations interconnected by said clock wire and said data wire, wherein at least one of said stations includes means for forcing each of said wires to their respective first voltage values and means for allowing each of said wires to assume their respective second voltage values, and wherein a master station is one of said stations which has gained priority to said data wire for initiating transfer of information on said data wire, said system being arranged for transferring information between said stations on said data wire under the synchronization of said voltage levels of said clock wire, and wherein each of said stations is addressable by one of (i) a long-format address and (ii) a short-format address; and
b) arbitration means for selecting one of said stations as a master station upon more than one of said stations attempting to provide information on said data wire at the same time;

said master station having protocol means for generating information on said data wire in synchronization with the voltage level of the clock wire, said master station further including message formatting means for enabling said master station to produce in an initial byte of information one of
a) a short-format address and
b)(i) a control signal of a forthcoming long-format address and (ii) a first significant portion of the long-format address, and if the control signal is present in the initial byte of data then in a second byte of data said message formatting means producing a second significant portion of the long-format address such that said master station does not address a station having a short-format address when addressing a station having a long-format address thereby enabling stations having both short-format and long-format addresses to communicate in said system.

9. A station as claimed in claim 8, wherein the first significant portion of the long-format address is at least two bits.

10. A station as claimed in claim 8, wherein the second significant portion of the long-format address is at least seven bits.

11. A station as claimed in claim 8, and comprising a slope-controlled output stage having an output connected to one of said wires, said stage having pull down switch means drivable by a stage input signal for pulling down the stage output and further including low-pass filtering means for delaying the pulling down of the stage output such that an output slope of said stage is expanded.

12. A method of addressing stations in an $I^2C$ bus system wherein each station is addressable by one of i) a short-format address and ii) a long-format address, the method including the steps of:

producing in an initial byte of information one of
a) a short-format address and
b) (i) a control signal indicating a forthcoming long-format address and (ii) a first significant portion of the long-format address; and if the control signal is present in the initial byte of data then in a second byte of data producing a second significant portion of the long-format address such that a station having a short-format address is not addressed when addressing a station having a long-format address thereby enabling stations having both short-format and long-format addresses to communicate on said $I^2C$ bus system.

13. The method as claimed in claim 12, wherein the control signal and the first significant portion of the long-format address do not in combination form a short-format address.

14. An $I^2C$ bus system having an extended addressability feature and comprising:

message formatting means for producing in an initial byte of information one of
a) a short-format address and
b) (i) a control signal indicating a forthcoming long-format address and (ii) a first significant portion of the long-format address, and if a control signal is present in the initial byte of data then in a second byte of data said message formatting means producing a second significant portion of the long-format address such that a station having a short-format address is not addressed when addressing a station having a long-format address thereby enabling stations having both short-format and long-format addresses to communicate in said $I^2C$ bus system.

15. The I²C bus system as claimed in claim 14, wherein the control signal and the first significant portion of said long-format address do not in combination form a short-format address.

16. A system for data transmission comprising:
   (A) slave stations comprising a data terminal and a clock terminal and each slave station being addressable by one of i) a long-format address and ii) a short-format address
   (B) at least one master transmitting station which is capable of controlling data transmission, comprising:
      (a) a clock terminal;
      (b) a data terminal;
      (c) means for producing a clock signal at the clock terminal by allowing the clock terminal to assume a second voltage level for each of a series of periodic clock pulse intervals and by forcing the clock terminal to a first voltage level at all other times during production of the clock signal;
      (d) means for producing a start signal which indicates that the master station is prepared to control data transmission by allowing the voltage level at the data terminal to assume a second voltage level for a first fraction of a clock pulse interval and by then forcing the voltage at the data terminal to a first voltage level during the same clock pulse interval;
      (e) means for producing a stop signal which indicates that the master station has finished controlling data transmission by forcing the voltage level at the data terminal to the first voltage level during a first fraction of a clock pulse interval and then allowing the voltage at the data terminal to transition to the second voltage level during the same clock pulse interval;
      (f) at least all but one of the master transmitting stations further comprising means for establishing priority when a plurality of master stations simultaneously attempt to control data transmission; and
      (g) at least one master transmitting station including message formatting means for producing in an initial byte of data one of a) a short-format address and b) (i) a control signal indicating a forthcoming long-format address and (ii) a first significant portion of the long-format address, and if the control signal is present in the initial byte of data then in a second byte of data the message formatting means producing a second significant portion of the long-format address such that the master transmitting station does not address a station having a short-format address when addressing a station having a long-format address thereby enabling stations having both short-format and long-format addresses to communicate in the system;
   (C) a data bus which interconnects the data terminals of all the stations;
   (D) a clock bus which interconnects the clock terminals of all the stations; and
   (E) means which maintain the buses at the second voltage level in the absence of forcing by the stations.

17. A master data transmission station for communicating in a system having a plurality of slave stations each addressable by one of i) a short-format address and ii) a long-format address, the master station comprising:
   (a) a clock terminal;
   (b) a data terminal;
   (c) means for producing a clock signal at the clock terminal by allowing the clock terminal to assume a second voltage level for each of a series of periodic clock pulse intervals and by forcing the clock terminal to a first voltage level at all other times during production of the clock signal;
   (d) means for producing a start signal which indicates that the station is prepared to transmit data by allowing the voltage level at the data terminal to assume a second voltage level for a first fraction of a clock pulse interval and by then forcing the voltage at the data terminal to a first voltage level during the same clock pulse interval;
   (e) means for producing a stop signal which indicates that the station has finished transmitting data by forcing the voltage level at the data terminal to the first voltage level during a first fraction of a clock pulse interval and then allowing the voltage at the data terminal to transition to the second voltage level during the same clock pulse interval; and
   (f) message formatting means for producing in an initial byte of data one of a) a short-format address and b) (i) a control signal indicating a forthcoming long-format address and (ii) a first significant portion of the long-format address, and if the control signal is present in the initial byte of data then in a second byte of data the message formatting means producing a second significant portion of the long-format address such that the master station does not address a station having a short-format address when addressing a station having a long-format address thereby enabling the master station to communicate with slave stations having both short-format and long-format addresses.

18. A system for data transmission comprising:
   (A) slave stations comprising a data terminal and a clock terminal and each slave station addressable by one of i) a short-format address and ii) a long-format address;
   (B) at least two master transmitting stations which are capable of controlling data transmission, comprising each:
      (a) a clock terminal;
      (b) a data terminal;
      (c) means for producing a clock signal at the clock terminal by allowing the clock terminal to assume a second voltage level for each of a series of periodic clock pulse intervals and by forcing the clock terminal to a first voltage level at all other times during production of the clock signal;
      (d) means for producing a start signal which indicates that the master station is prepared to control data transmission by allowing the voltage level at the data terminal to assume a second voltage level for a first fraction of a clock pulse interval and by then forcing the voltage at the data terminal to a first voltage level during the same clock pulse interval;
      (e) means for producing a stop signal which indicates that the master station has finished controlling data transmission by forcing the voltage level at the data terminal to the first voltage level during a first fraction of a clock pulse interval and then allowing the voltage at the data terminal to transition to the second voltage level during the same clock pulse interval; and
      (f) message formatting means for producing in an initial byte of data one of a) a short-format address and b) (i) a control signal indicating a forthcoming long-format address and (ii) a first significant portion of the long-format address, and if the control signal is present in the initial byte of data then in a second byte of data the message formatting means producing a second significant portion of the long-format address such that said master station does not address a station having a short-format address when addressing a station having a long-format address thereby enabling stations having both short-format and long-format addresses to communicate in said system;

(C) a data bus which interconnects the data terminals of all the stations;

(D) a clock bus which interconnects the clock terminals of all the stations; and (E) means which maintain the buses at the second voltage level in the absence of forcing by the stations.

19. A method of data transmission on a data transmission system which comprises a plurality of stations, each station having a data terminal and a clock terminal and addressable by one of i) a short-format address and ii) a long-format address, the data terminals of all stations being interconnected by a data bus and the clock terminals of all stations being interconnected by a clock bus, comprising:

transmitting a clock signal from a first master station along the clock bus by allowing the clock terminal of the first master station to assume a second voltage level during each of a series of periodic clock pulse intervals and by forcing the clock terminal of the first master station to a first voltage level at all other times during transmission of the clock signal;

transmitting a start signal, which indicates that the first master station is prepared to control data transmission, by allowing the data terminal of the first master station to assume a second voltage level during a first fraction of a clock pulse interval and then forcing the voltage level at the data terminal of the first master station to a first voltage level during said clock pulse interval;

transmitting a stop signal which indicates that the first master station has finished controlling data transmission by forcing the voltage level at the data terminal of the first master station to the first voltage level during a first fraction of the clock pulse interval and by then allowing the voltage level at the data terminal of the first master station to transition to the second voltage level during the same clock pulse interval; and message formatting means for producing in an initial byte of data one of a) a short-format address and b) (i) a control signal indicating a forthcoming long-format address and (ii) a first significant portion of said long-format address, and if the control signal is present in the initial byte of data then in a second byte of data said message formatting means producing a second significant portion of the long-format address such that the first master station does not address a station having a short-format address when addressing a station having a long-format address thereby enabling stations having both short-format and long-format addresses to communicate in the system.

20. A communication system comprising:

a first plurality of transmitting and receiving stations including at least one master station and at least one slave station addressable by one of i) a short-format address and ii) a long-format address;

a data bus for transporting a series of data bits between at least one transmitting station and at least one receiving station;

a clock bus for transporting a synchronizing clock signal in synchronism with each data bit;

each bus further comprising logic means for forming a wired logic function between levels which denote a first and a second logic value respectively which are transmitted by the stations so that the level of the bus can be pulled to the first logic value by any station presenting a signal having the first logic value to the bus thereby masking any signal having the second logic value that may be presented to the bus;

wherein each master station comprises:

(a) clock transmitting means which generate a series of clock pulses, each having the second logic value, on the clock bus to define a series of bit cells;

(b) means which form a first stop signal by forming a signal transition on the data bus from said first logic value to said second logic value, during the presence of a signal of the second logic value on the clock bus;

(c) means which form a first start signal by forming a signal transition on the data bus from said second logic value to said first logic value during the presence of a signal of the second logic value on the clock bus;

(d) message formatting means for producing in an initial byte of data one of a) a short-format address and b) (i) a control signal indicating a forthcoming long-format address and (ii) a first significant portion of the long-format address, and if the control signal is present in the initial byte of data then in a second byte of data said message formatting means producing a second significant portion of the long-format address such that the master station does not address a station having a short-format address when addressing a station having a long-format address thereby enabling stations having both short-format and long-format addresses to communicate in the system.

\* \* \* \* \*